(12) United States Patent
Kim et al.

(10) Patent No.: US 11,823,028 B2
(45) Date of Patent: Nov. 21, 2023

(54) METHOD AND APPARATUS FOR QUANTIZING ARTIFICIAL NEURAL NETWORK

(71) Applicant: SAMSUNG ELECTRONICS CO., LTD., Suwon-si (KR)

(72) Inventors: Do-yun Kim, Gwacheon-si (KR); Han-young Yim, Suwon-si (KR); Byeoung-su Kim, Hwaseong-si (KR); Nak-woo Sung, Yongin-si (KR); Jong-han Lim, Seoul (KR); Sang-hyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1300 days.

(21) Appl. No.: 16/044,163

(22) Filed: Jul. 24, 2018

(65) Prior Publication Data
US 2019/0147322 A1    May 16, 2019

(30) Foreign Application Priority Data
Nov. 13, 2017   (KR) .................. 10-2017-0150707

(51) Int. Cl.
*G06N 3/048*   (2023.01)
*G06F 17/18*   (2006.01)
*G06N 3/08*    (2023.01)

(52) U.S. Cl.
CPC .............. *G06N 3/048* (2023.01); *G06F 17/18* (2013.01); *G06N 3/08* (2013.01)

(58) Field of Classification Search
CPC ......... G06N 3/0481; G06N 3/08; G06F 17/18
See application file for complete search history.

(56) References Cited

U.S. PATENT DOCUMENTS

| | | |
|---|---|---|
| 8,611,604 B2 | 12/2013 | Fujiyoshi |
| 9,053,391 B2 | 6/2015 | Wang et al. |
| 9,251,425 B2 | 2/2016 | Datta et al. |
| 9,424,493 B2 | 8/2016 | He et al. |

(Continued)

FOREIGN PATENT DOCUMENTS

| | | |
|---|---|---|
| CN | 106779053 A | 5/2017 |
| CN | 107239829 A | 10/2017 |

(Continued)

OTHER PUBLICATIONS

Tremeau et al. "Color quantization error in terms of perceived image quality," Proceedings of ICASSP '94. IEEE International Conference on Acoustics, Speech and Signal Processing, 1994, pp. V/93-V/96 vol. 5 (Year: 1994).*

(Continued)

*Primary Examiner* — Miranda M Huang
*Assistant Examiner* — Yao David Huang
(74) *Attorney, Agent, or Firm* — Sughrue Mion, PLLC

(57) ABSTRACT

An artificial neural network (ANN) quantization method for generating an output ANN by quantizing an input ANN includes: obtaining second parameters by quantizing first parameters of the input ANN; obtaining a sample distribution from an intermediate ANN in which the obtained second parameters have been applied to the input ANN; and obtaining a fractional length for the sample distribution by quantizing the obtained sample distribution.

18 Claims, 9 Drawing Sheets

(56) References Cited

U.S. PATENT DOCUMENTS

| | | | |
|---|---|---|---|
| 9,594,983 B2 | 3/2017 | Alattar et al. | |
| 2012/0134555 A1* | 5/2012 | Iizuka | G16H 30/20 |
| | | | 382/128 |
| 2012/0316886 A1 | 12/2012 | Pishehvar et al. | |
| 2013/0144602 A1 | 6/2013 | Yeu et al. | |
| 2014/0098883 A1* | 4/2014 | Hannuksela | H04N 19/597 |
| | | | 375/240.12 |
| 2016/0293167 A1 | 10/2016 | Chen et al. | |
| 2016/0328644 A1 | 11/2016 | Lin et al. | |
| 2016/0328646 A1 | 11/2016 | Lin et al. | |
| 2016/0328647 A1 | 11/2016 | Lin et al. | |
| 2017/0193390 A1 | 7/2017 | Weston et al. | |
| 2017/0286830 A1 | 10/2017 | El-Yaniv et al. | |
| 2018/0046894 A1 | 2/2018 | Yao | |

FOREIGN PATENT DOCUMENTS

| | | |
|---|---|---|
| JP | 5846553 B2 | 1/2016 |
| TW | 201324203 A1 | 6/2013 |
| WO | 2016/182671 A1 | 11/2016 |

OTHER PUBLICATIONS

Hui et al., "When is overload distortion negligible in uniform scalar quantization?" Proceedings of IEEE International Symposium on Information Theory, 1997, p. 517 (Year: 1997).*

P. Kabal, "Quantizers for the gamma distribution and other symmetrical distributions," in IEEE Transactions on Acoustics, Speech, and Signal Processing, vol. 32, No. 4, pp. 836-841, Aug. 1984 (Year: 1984).*

Gysel et al., "Hardware-oriented approximation of convolutional neural networks," arXiv:1604.03168v3 [cs.CV] Oct. 20, 2016 (Year: 2016).*

Lin et al., "Fixed Point Quantization of Deep Convolutional Networks," arXiv:1511.06393v3 [cs.LG] Jun. 2, 2016 (Year: 2016).*

Villani et al., "The Multivariate Split Normal Distribution and Asymmetric Principal Components Analysis," Sveriges Riksbank Working Paper Series No. 175, Dec. 2004 (Year: 2004).*

P. Spurek, "General split gaussian Cross-Entropy clustering," Expert Systems With Applications 68 (2017) 58-68 (Year: 2017).*

Seo et al., "Variable individual step-size subband adaptive filtering algorithm," Electronics Letters, Jan. 30, 2014 vol. 50 No. 3 pp. 177-178 (Year: 2014).*

Khalid Sayood, "Scalar Quantization" in Data Compression (Fifth edition), The Morgan Kaufmann Series in Multimedia Information and Systems, 2018, pp. 257-298 (Year: 2018).*

Search Report and Written Opinion dated Sep. 12, 2019 by the Intellectual Property Office of Singapore in counterpart Singapore Patent Application No. 10201809958Y.

Communication dated Mar. 2, 2021 by the Indian Patent Office in corresponding Indian Application No. 201834035206.

Communication dated Aug. 30, 2022 by the Taiwan Patent Office in corresponding TW Patent Application No. 107140109.

* cited by examiner

METHOD AND APPARATUS FOR QUANTIZING ARTIFICIAL NEURAL NETWORK

CROSS-REFERENCE TO RELATED APPLICATION

This application claims priority from Korean Patent Application No. 10-2017-0150707, filed on Nov. 13, 2017 in the Korean Intellectual Property Office, the disclosure of which is incorporated herein in its entirety by reference.

BACKGROUND

Apparatuses and methods consistent with one or more exemplary embodiments relate to an artificial neural network, and more particularly, to a method and apparatus for quantizing an artificial neural network.

An artificial neural network (ANN) may refer to a computing device or a method performed by a computing device to generate interconnected sets of artificial neurons (or neuron models). Artificial neurons may generate output data by performing simple operations on input data, and the output data may be transmitted to other artificial neurons. As an example of an ANN, a deep neural network (DNN) or deep learning architecture may have a multi-layer structure. Layers of an ANN may have parameters and multiple sample distributions may be generated, by training each of the layers according to multiple samples.

SUMMARY

Aspects of one or more exemplary embodiments provide a method and apparatus for quantizing an artificial neural network (ANN), by which an arbitrary ANN is quantized with high accuracy.

According to an aspect of an exemplary embodiment, there is provided an artificial neural network (ANN) quantization method for generating an output ANN by quantizing an input ANN, the ANN quantization method including: obtaining second parameters by quantizing first parameters of the input ANN; obtaining a sample distribution from an intermediate ANN in which the obtained second parameters have been applied to the input ANN; and obtaining a fractional length for the obtained sample distribution by quantizing the obtained sample distribution.

According to an aspect of another exemplary embodiment, there is provided an apparatus for generating an output artificial neural network (ANN) by quantizing an input ANN, the apparatus including: a memory storing computer-executable instructions; and at least one processor configured to execute the stored computer-executable instructions to implement: a parameter quantizer configured to obtain second parameters by quantizing first parameters of the input ANN; a neural network interface configured to obtain a sample distribution from an intermediate ANN in which the obtained second parameters have been applied to the input ANN; and a sample quantizer configured to obtain a fractional length for the obtained sample distribution.

According to an aspect of another exemplary embodiment, there is provided a method of quantizing a floating-point neural network, the method including: obtaining quantized parameters by quantizing parameters in a same category in the floating-point neural network; obtaining a sample distribution from a semifixed-point artificial neural network (ANN) in which the obtained quantized parameters have been applied to the floating-point neural network; and obtaining a fractional length for the obtained sample distribution.

According to an aspect of another exemplary embodiment, there is provided an apparatus for quantizing a floating-point neural network (ANN), the apparatus including: a memory storing computer-executable instructions; and at least one processor configured to execute the stored computer-executable instructions to implement: a parameter quantizer configured to obtain quantized parameters by quantizing parameters in a same category in the floating-point neural network; a neural network interface configured to obtain a sample distribution from a semifixed-point artificial neural network (ANN) in which the obtained quantized parameters have been applied to the floating-point neural network; and a sample quantizer configured to obtain a fractional length for the obtained sample distribution.

BRIEF DESCRIPTION OF THE DRAWINGS

One or more exemplary embodiments will be more clearly understood from the following detailed description taken in conjunction with the accompanying drawings in which.

DETAILED DESCRIPTION OF EXEMPLARY EMBODIMENTS

Figure 1:
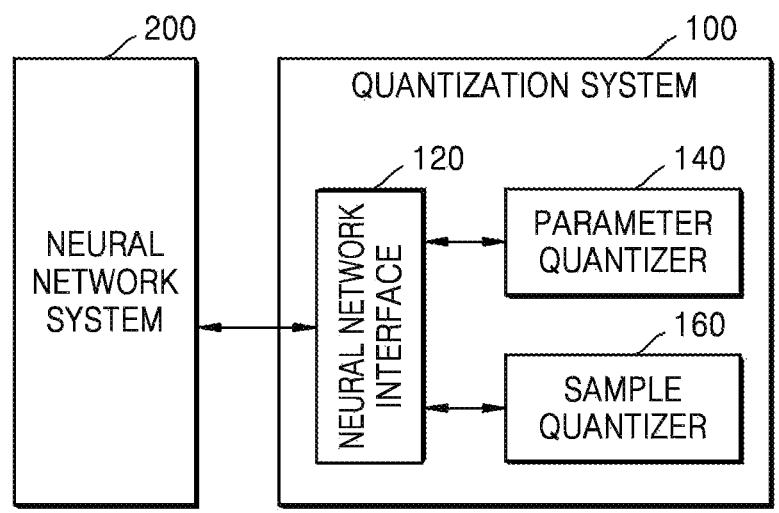
FIG. 1 is a block diagram of a quantization system and a neural network system, according to an exemplary embodiment.

Hereinafter, one or more exemplary embodiments will be described in detail in conjunction with the accompanying drawings, wherein like reference numerals refer to like elements throughout. As used herein, the term "and/or" includes any and all combinations of one or more of the associated listed items. Similarly, expressions such as "at least one of," when preceding a list of elements, modify the entire list of elements and do not modify the individual elements of the list.

FIG. 1 is a block diagram of a quantization system 100 and a neural network system 200 according to an exemplary embodiment. The neural network system 200 may provide an artificial neural network (ANN), and the quantization system 100 may quantize the ANN provided by the neural network system 200 and provide the neural network system 200 with an ANN of which at least a portion has been quantized.

The ANN may refer to a computing system inspired from a biological neural network that forms an animal's brain. The ANN may learn to perform tasks by considering multiple samples (or examples), unlike classical algorithms that perform tasks according to predefined conditions, such as rule-based programming. The ANN may have a structure in which artificial neurons (or neurons) are connected to one another. A connection between the neurons may be referred to as a synapse. Each of the neurons may process a received signal and transmit a processed signal to another neuron through the synapse. The output of the neuron may be referred to as "activation." The neuron and/or the synapse may have varying weights, and the influence of a signal processed by the neuron may increase or decrease depending on its weight. In particular, the weight associated with an individual neuron may be referred to as a bias.

A deep neural network (DNN) or deep learning architecture may have a layer structure, and an output of a particular layer may be an input of a subsequent layer. In such a multi-layered structure, each layer may be trained according to multiple samples. An ANN, such as the DNN, may be implemented by a plurality of processing nodes, each corresponding to an artificial neuron, and may utilize high computational complexity and computing resources to obtain good (e.g., high-accuracy) results.

To reduce computational complexity, an ANN may be quantized. Quantization may refer to a process of mapping input values to a smaller number of values than the number of input values, like mapping a real number to an integer through rounding. For example, quantization in an ANN may be applied to layer activations, weights, biases, thresholds, input/output distributions, and so on. A quantized ANN may enable use of a reduced number of computing resources.

Quantization of an ANN may involve a process of converting a floating-point neural network into a fixed-point neural network. Converting a floating-point neural network into a fixed-point neural network may include determining (e.g., obtaining) a fractional length of the fixed-point neural network. Floating-point numbers may include signs, exponents, and significant digits (or significand), whereas fixed-point numbers may include integer parts and fraction parts. In some examples, the integer parts of the fixed-point numbers may include sign bits. An ANN using floating-point numbers, i.e., a floating-point neural network, may have high accuracy and high computational complexity, whereas an ANN using fixed-point numbers, i.e., a fixed-point neural network, may have reduced accuracy and reduced computational complexity.

Due to a trade-off relationship between accuracy of results and computational complexity in the ANN, quantization of the ANN may result in a variation in accuracy and the variation in the accuracy may depend on a quantization method. As will be described below with reference to drawings, the quantization system 100 according to an exemplary embodiment may provide an efficient means for quantization of an ANN. Accordingly, the quantization system 100 may provide quantization with respect to an arbitrary ANN, and may provide a quantized ANN having the same performance as the performance of the arbitrary ANN. Due to the quantized ANN having high accuracy, computing resources for implementing the ANN may be decreased, and as a result, the application network of the ANN may be significantly expanded.

The neural network system 200 may be any system that provides (or drives) an ANN, and may be referred to as a neural network apparatus. For example, the neural network system 200 may be a computing system that includes at least one processor and a memory. As a non-limiting example, the neural network system 200 may be a mobile computing system, such as a laptop computer, a tablet computer, or a smart phone, as well as a stationary computing system, such as a desktop computer, a work station, or a server.

According to one or more exemplary embodiments, the neural network system 200 may drive a floating-point neural network and may provide information about the floating-point neural network to the quantization system 100. According to one or more exemplary embodiments, the neural network system 200 may drive an ANN according to information received from the quantization system 100 and may provide information about the driven ANN to the quantization system 100. In FIG. 1, the neural network system 200 and the quantization system 100 are separate systems. However, in one or more exemplary embodiments, the neural network system 200 and the quantization system 100 may be formed as a single system.

The quantization system 100 may be any system that performs quantization according to one or more exemplary embodiments, and may be referred to as a quantization apparatus. For example, the quantization system 100 may be a computing system that includes at least one processor and a memory. The quantization system 100 may be a stationary computing system or a mobile computing system. The quantization system 100 may quantize an ANN, based on information about the ANN provided by the neural network system 200. Herein, an ANN to be quantized may be referred to as an input ANN, and an ANN created by quantizing the input ANN may be referred to as an output ANN. According to one or more exemplary embodiments, the input ANN may include a floating-point neural network, and the output ANN may include a fixed-point neural network.

As illustrated in FIG. 1, the quantization system 100 may include a neural network interface 120, a parameter quantizer 140, and a sample quantizer 160. According to one or more exemplary embodiments, each of the neural network interface 120, the parameter quantizer 140, and the sample quantizer 160 may be implemented with a logic block implemented through logic synthesis, a software block executed by a processor, or a combination thereof. According to one or more exemplary embodiments, each of the neural network interface 120, the parameter quantizer 140, and the sample quantizer 160 may be a procedure as a set of instructions that are executed by a processor, and may be stored in a memory accessible by the processor.

The neural network interface 120 may provide an interface for the neural network system 200 to the parameter quantizer 140 and the sample quantizer 160. For example, the neural network interface 120 may provide the parameters of an input ANN received from the neural network system 200 to the parameter quantizer 140, and may provide quantized parameters received from the parameter quantizer 140 to the neural network system 200. In addition, the neural network interface 120 may provide a sample distribution received from the neural network system 200 to the sample quantizer 160, and may provide a quantized sample distribution received from the sample quantizer 160 or a fractional length (e.g., $FL_{sam}$ of FIG. 5) to the neural network system 200.

The parameter quantizer 140 may generate (e.g., obtain) the quantized parameters (hereinafter, referred to as output parameters or second parameters) from parameters received from the neural network system 200 via the neural network interface 120 (hereinafter, referred to as input parameters or first parameters). As described below with reference to FIG. 2, an ANN may include various parameters, and quantization of the ANN may include quantization of these parameters. The parameter quantizer 140 may quantize at least some of the parameters of the input ANN, and accordingly, the parameters of the input ANN may be quantized prior to the sample distribution. As described below with reference to FIG. 2, because parameters and sample distributions in an ANN may have different characteristics, quantization of the parameters may be separated from quantization of the sample distributions. The parameter quantizer 140 may provide the quantized parameters to the neural network system 200 via the neural network interface 120. Examples of an operation of the parameter quantizer 140 will be described below with reference to FIG. 4.

The sample quantizer 160 may generate (e.g., obtain) quantized sample distributions (hereinafter, referred to as output sample distributions) from sample distributions received from the neural network system 200 via the neural network interface 120 (hereinafter, referred to as input sample distributions). The input sample distributions may have a different form than related art distributions, such as a Gaussian distribution, a Laplacian distribution, and a Gamma distribution. As will be described below, the sample quantizer 160 according to one or more exemplary embodiments may not be limited with respect to form of the sample distributions and may provide quantization having improved accuracy with respect to a sample distribution having an arbitrary form.

According to one or more exemplary embodiments, the sample quantizer 160 may receive sample distributions generated from an ANN obtained by applying the quantized parameters obtained by the parameter quantizer 140 to the input ANN. In the present specification, the ANN obtained by applying the quantized parameters obtained by the parameter quantizer 140 to the input ANN may be referred to as an intermediate ANN. In particular, while a floating-point neural network is being converted into a fixed-point neural network, an ANN obtained by applying quantized parameters to the floating-point neural network may be referred to as a semifixed-point neural network. The sample quantizer 160 quantizes sample distributions generated by the quantized parameters which are to be applied to the quantized ANN, namely, the output ANN. Thus, quantization accuracy with respect to the sample distributions of the output ANN may be improved. In other words, quantization errors with respect to the sample distributions may be reduced. Examples of an operation of the sample quantizer 160 will be described below with reference to FIGS. 5, 6A-6C, 7-9, and 10A-10B.

Figure 2:
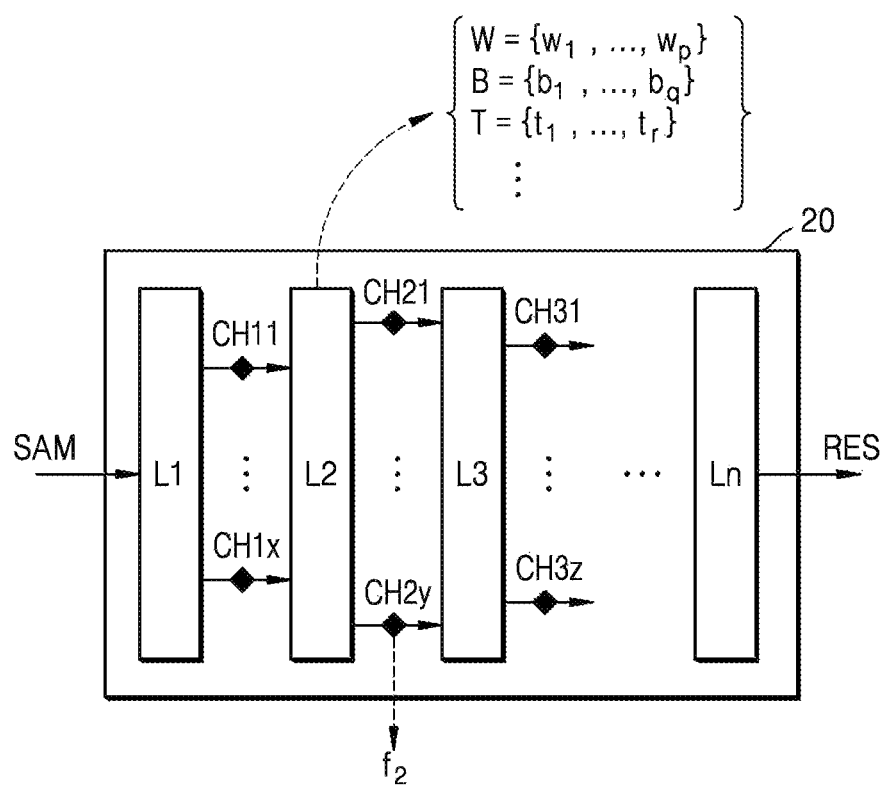
FIG. 2 is a diagram illustrating an example of an artificial neural network (ANN) according to an exemplary embodiment.

FIG. 2 is a diagram illustrating an example of an ANN according to an exemplary embodiment. In detail, FIG. 2 is a diagram schematically illustrating the structure of a DNN 20 as an example of an ANN.

As shown in FIG. 2, the DNN 20 may include a plurality of layers, i.e., first to n-th layers L1, L2, L3, . . . , and Ln, and outputs of each of the first to n-th layers L1, L2, L3, . . . , and Ln may be input to a subsequent layer through at least one channel. For example, the first layer L1 may provide outputs to the second layer L2 through a plurality of channels CH11 to CH1x by processing a sample SAM, and the second layer L2 may also provide outputs to the third layer L3 through a plurality of channels CH21 to CH2y. Finally, the n-th layer Ln may output a result RES, and the result RES may include at least one value associated with the sample SAM. The numbers of channels through which the outputs of the first to n-th layers L1, L2, L3, . . . , and Ln are respectively delivered may be equal to or different from one another. For example, the number of channels CH21 to CH2y of the second layer L2 and the number of channels CH31 to CH3z of the third layer L3 may be equal to or different from each other.

The sample SAM may be input data that is processed by the DNN 20. For example, the sample SAM may be an image including a letter written by a person with a pen, and the DNN 20 may output the result RES containing a value representing the letter by recognizing the letter from the image. The result RES may include a plurality of probabilities corresponding to different letters, and the most likely letter among the different letters may correspond to a highest probability. Each of the first to n-th layers L1, L2, L3, . . . , and Ln of the DNN 20 may generate its own outputs by processing the sample SAM or outputs of a previous layer based on parameters (e.g., weights, biases, thresholds, etc.) generated by learning a plurality of images including letters or predefined parameters (e.g., weights, biases, thresholds, etc.). For example, as shown in FIG. 2, the second layer L2 may include a weight set W including a plurality of weights $w_1, \ldots,$ and $w_p$, a bias set B including a plurality of biases $b_1, \ldots,$ and $b_q$, and a threshold set T including a plurality of thresholds $t_1, \ldots,$ and $t_r$, and may further include other parameters not specifically shown in FIG. 2.

According to one or more exemplary embodiments, at least some of the parameters of the DNN 20 may be quantized by the parameter quantizer 140 of FIG. 1. According to one or more exemplary embodiments, the parameter quantizer 140 may independently quantize parameters for each of the plurality of layers L1, L2, L3, . . . , and Ln, or may independently quantize parameters for each of the plurality of channels (for example, CH21, . . . , and CH2y). According to one or more exemplary embodiments, the parameters of at least two layers may be commonly quantized, and the parameters of at least two channels may be commonly quantized. According to one or more exemplary embodiments, the weights, the biases, and the thresholds may be quantized independently from each other, or parameters of at least two different types may be commonly quantized. One or more exemplary embodiments will now be described by mainly referring to an illustration of quantizing weights as the parameters, though it is understood that one or more other exemplary embodiments are not limited thereto.

The DNN 20 may include an activation function between layers. The activation function may convert an output of a previous layer to an input of a next layer. For example, as shown in FIG. 2, an activation function $f_2$ may be a non-linear function, for example, a rectified linear unit (ReLU), a parametric rectified linear unit (PReLU), a hyperbolic tangent (tanh), or a sigmoid function, and may nonlinearly convert an output of the second layer L2 between the second layer L2 and the third layer L3.

According to one or more exemplary embodiments, the sample quantizer 160 of FIG. 1 may receive not only an input of an activation function, namely, a pre-activation value, but also an output of the activation function, as sample distributions, and perform quantization. In addition, according to one or more exemplary embodiments, the neural network interface 120 of FIG. 1 may obtain an input distribution in units of layers and/or channels of the ANN (e.g., the DNN 20). For example, the sample distributions received by the sample quantizer 160 of FIG. 1 may be obtained from outputs produced by one layer through a plurality of channels, or may be obtained from an output corresponding to one channel.

Figure 3:
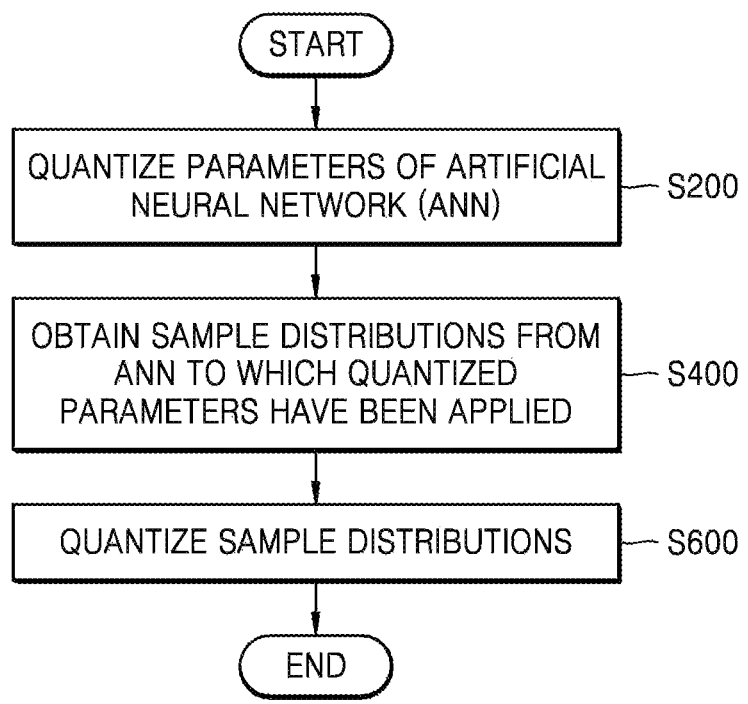
FIG. 3 is a flowchart of a method of quantizing an ANN, according to an exemplary embodiment.

FIG. 3 is a flowchart of a method of quantizing an ANN, according to an exemplary embodiment. For example, the method of FIG. 3 may be performed by the quantization system 100 of FIG. 1. Hereinafter, FIG. 3 will be described with reference to FIG. 1.

Referring to FIG. 3, in operation S200, parameters of the ANN may be quantized. For example, the parameter quantizer 140 of FIG. 1 may generate quantized parameters corresponding to given fractional lengths, and a final fractional length (for example, $FL_{par}$ of FIG. 4) for parameters may be determined based on a quantization error of the quantized parameters. An example of operation S200 will be described below with reference to FIG. 4.

In operation S400, sample distributions may be obtained from an ANN to which the quantized parameters have been applied. For example, the parameter quantizer 140 of FIG. 1 may provide the quantized parameters to the neural network system 200 via the neural network interface 120, and the neural network system 200 may drive an intermediate ANN obtained by applying the quantized parameters to an input ANN. The neural network interface 120 may receive a sample distribution of the intermediate ANN from the neural network system 200, and may provide the received sample distribution as an input sample distribution to the sample quantizer 160.

In operation S600, the sample distributions may be quantized. For example, the sample quantizer 160 of FIG. 1 may split the input sample distribution having an arbitrary shape into at least two sample groups, and may independently approximate each of the sample groups to a continuous probability distribution (CPD). The sample quantizer 160 may calculate (e.g., obtain) an optimal step size, based on the CPD, and may determine (e.g., obtain) a fractional length (for example, $FL_{sam}$ of FIG. 5) for quantizing the input sample distribution from the calculated step size. Examples of operation S600 will be described below with reference to FIGS. 5, 6A-6C, 7-9, and 10A-10B.

Figure 4:
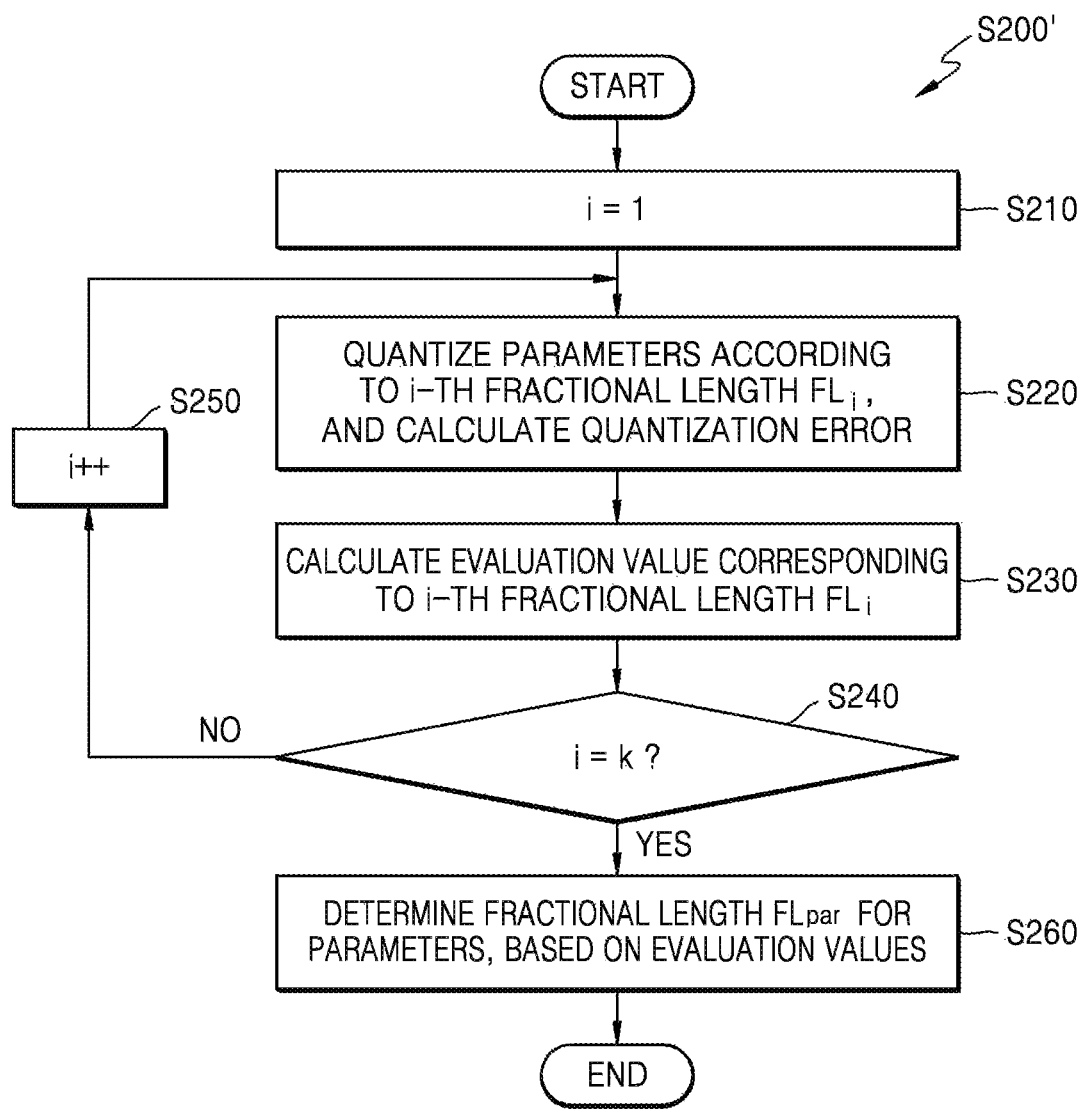
FIG. 4 is a flowchart of an example of operation S200 of FIG. 3, according to an exemplary embodiment.

FIG. 4 is a flowchart of an example of operation S200 of FIG. 3, according to an exemplary embodiment. As described above with reference to FIG. 3, in operation S200' of FIG. 4, the parameters of the ANN may be quantized. As shown in FIG. 4, operation S200' may include a plurality of operations S210 through S260. According to one or more exemplary embodiments, operation S200' of FIG. 4 may be performed by the parameter quantizer 140 of FIG. 1. FIG. 4 will now be described with reference to FIG. 1.

In operation S210, initialization may be performed by setting a variable i to be 1. The variable i may be an index that indicates each of a plurality of fractional lengths, and evaluation values respectively corresponding to the plurality of fractional lengths may be calculated in subsequent operations. According to one or more exemplary embodiments, the plurality of fractional lengths may be determined (e.g., obtained) by a system on which a quantized ANN is to be mounted (for example, 400 of FIG. 12). For example, a plurality of available fractional lengths may be determined according to a bit width of the system. In the example of FIG. 4, when k is a positive integer, k fractional lengths $FL_1, \ldots,$ and $FL_k$ may be used, and the variable i may sequentially increase from 1 to k.

In operation S220, the parameters may be quantized according to an i-th fractional length $FL_i$, and a quantization error may be calculated. When a fractional length is given, the parameters may be quantized, and the quantization error may be calculated from not-yet-quantized parameters (i.e., input parameters or first parameters) and quantized parameters (i.e., output parameters or second parameters). For example, when a weight quantized from a weight $w_j$ according to the i-th fractional length $FL_i$ is $Q(w_j, FL_i)$, a quantization error $E_{ij}$ may be calculated using [Equation 1].

$$E_{ij} = |w_j - Q(w_j, FL_i)| \qquad \text{[Equation 1]}$$

In operation S230, an evaluation value corresponding to the i-th fractional length $FL_i$ may be calculated. The evaluation value may indicate a value that represents the performance of quantization based on the quantization error of [Equation 1] or a quantization error defined differently from the quantization error of [Equation 1]. As a non-limiting example, the evaluation value may be a mean squared error (MSE), a signal to quantization noise ratio (SQNR), or the like. According to one or more exemplary embodiments, an evaluation value $D_w(FL_i)$ for the weights included in the weight set W in the given i-th fractional length $FL_i$ may be calculated using [Equation 2].

$$D_w(FL_i) = \sum_{w_j \in W} (E_{ij})^2 \qquad \text{[Equation 2]}$$

In operation S240, it may be determined whether the variable i is identical to k. In other words, it may be checked whether evaluation values have been calculated for all of the k fractional lengths $FL_1, \ldots,$ and $FL_k$. When the variable i is not identical to k, in operation S250, the variable i may be increased by 1, and then operation S220 may be performed. On the other hand, when the variable i is identical to k, operation S260 may be performed.

In operation S260, a fractional length $FL_{par}$ for the parameters may be determined (e.g., obtained) based on the evaluation values. In other words, in operations S220 through S240, k evaluation values may be calculated, and, in operation S260, one of the k fractional lengths $FL_1, \ldots,$ and $FL_k$ may be determined to be the fractional length $FL_{par}$ for the parameters. For example, when an evaluation value is calculated using [Equation 2], a fractional length corresponding to a lowest evaluation value from among the k evaluation values may be selected. Unlike the sample distributions, the parameters of the input ANN may be deterministic values and, as described above, a fractional length that minimizes a quantization error may be determined. The method of FIG. 4 is merely an example of operation S200 of FIG. 3, and various quantization methods similar to or different from the method of FIG. 4 within the technical scope of the inventive concept may be employed to quantize the parameters.

Figure 5:
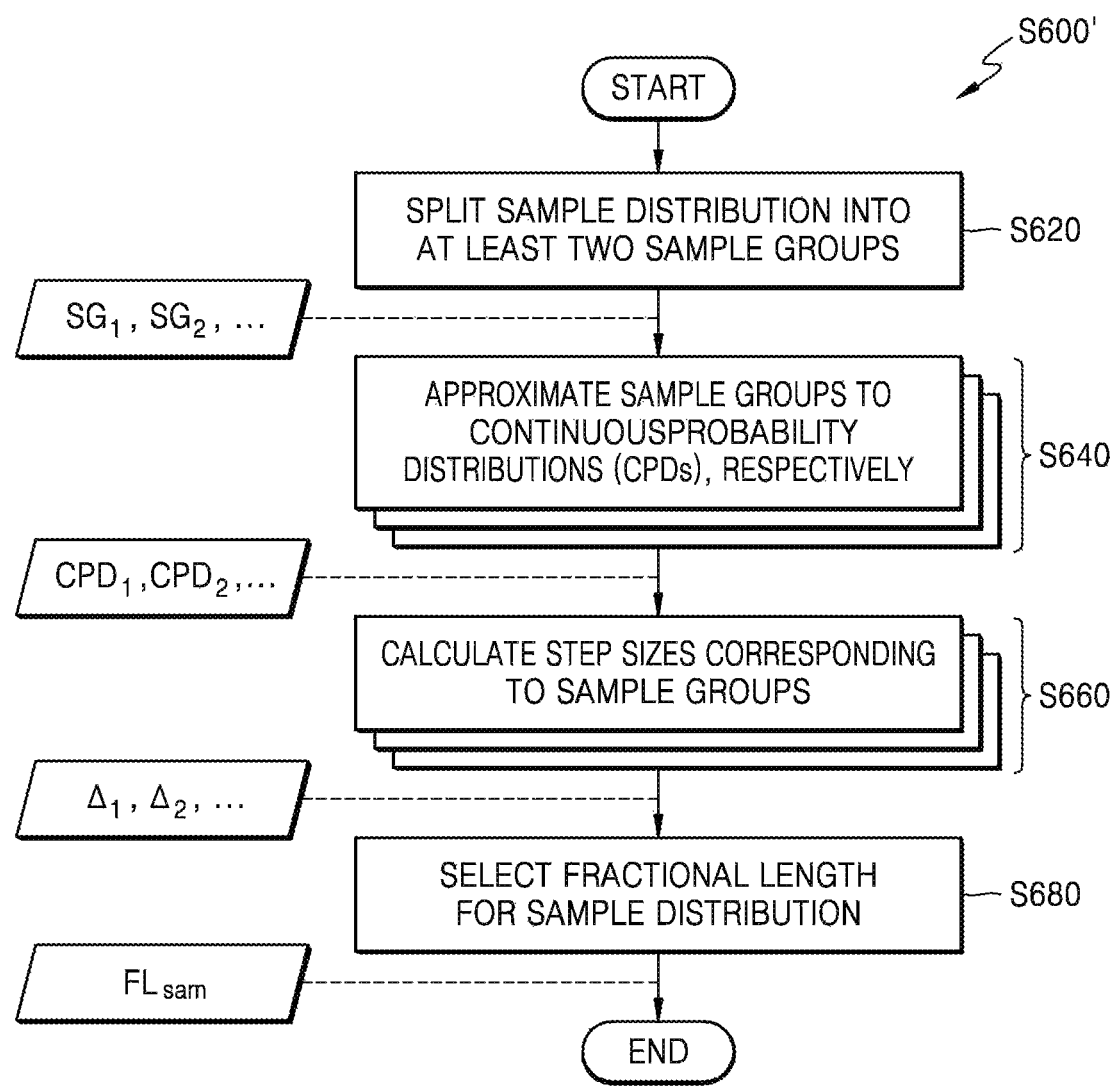
FIG. 5 is a flowchart of an example of operation S600 of FIG. 3, according to an exemplary embodiment.

FIG. 5 is a flowchart of an example of operation S600 of FIG. 3, according to an exemplary embodiment. As described above with reference to FIG. 3, in operation S600' of FIG. 6, sample distributions may be quantized. In detail, FIG. 5 illustrates an example of quantizing a single sample distribution and, as shown in FIG. 5, operation S600' may include a plurality of operations S620, S640, S660, and S680. According to one or more exemplary embodiments, operation S600' of FIG. 5 may be performed by the sample quantizer 160 of FIG. 1. FIG. 5 will now be described with reference to FIG. 1.

In operation S620, a sample distribution (or an input sample distribution) may be split into at least two sample groups. According to an exemplary embodiment, statistical characteristics may be used to quantize the sample distribution. Accordingly, to derive statistical characteristics of the sample distribution, the sample distribution may be split into at least two sample groups $SG_1$, $SG_2$, . . . , and the sample groups $SG_1$, $SG_2$, . . . may be independently approximated. An example of operation S620 will be described below with reference to FIG. 6.

In operation S640, the sample groups may be approximated to CPDs, respectively. According to one or more exemplary embodiments, the sample groups $SG_1$, $SG_2$, . . . generated in operation S620 may be respectively approximated to the CPDs by estimating at least one parameter of each of the CPDs. For example, each of the sample groups may be approximated to a generalized gamma distribution, a Gaussian distribution, or a Laplacian distribution. To estimate the parameters of the CPDs, a moment using method using a mean, a variance, or the like, a maximum likelihood method, a numerical calculation-based method, or the like may be used as a non-limiting example. Accordingly, at least two CPDs $CPD_1$, $CPD_2$, . . . having parameters with unique values may be derived from the at least two sample groups $SG_1$, $SG_2$, . . . .

According to one or more exemplary embodiments, the sample groups $SG_1$, $SG_2$, . . . may each be approximated to a generalized gamma distribution $p(x)$ having 4 parameters $\alpha$, $\beta$, $\lambda$, and $\mu$, as in [Equation 3].

$$p(x) = \mu |x|^{\beta} \cdot e^{-\lambda |x|^{\alpha}}, \text{ where } -\infty < x < \infty, \beta > -1, \text{ and } \alpha > 0. \quad \text{[Equation 3]}$$

where $\alpha$ and $\beta$ may be exponential decay parameters. When $\alpha = 1$, the 4 parameters $\alpha$, $\beta$, $\lambda$, and $\mu$ may be derived from a mean $m_x$ and a variance $\sigma_x^2$ according to the moment using method as shown in [Equation 4].

$$\alpha = 1, \beta = m_x^2/\sigma_x^2 - 1, \lambda = m_x/\sigma_x^2, \text{ and} \quad \text{[Equation 4]}$$

$$\mu = \frac{\lambda^{m_x^2/\sigma_x^2}}{2\Gamma(m_x^2 \square \sigma_x^2)}$$

In operation S660, step sizes corresponding to the sample groups may be calculated. In other words, the step sizes may be calculated from the sample groups and the CPDs derived from the sample groups. For example, a quantization error may be calculated from a sample group and a CPD, and a step size having a low quantization error may be calculated. Accordingly, step sizes $\Delta_1$, $\Delta_2$, . . . respectively corresponding to the sample groups may be calculated. An example of operation S660 will be described below with reference to FIG. 7.

In operation S680, a fractional length for the sample distribution may be selected. For example, at least one candidate fractional length may be derived from the step sizes calculated in operation S660, and one of the at least one candidate fractional length may be selected as a fractional length $FL_{sam}$ for the sample distribution. Examples of operation S800 will be described below with reference to FIGS. 8, 9, 10A, and 10B.

Figure 6A:
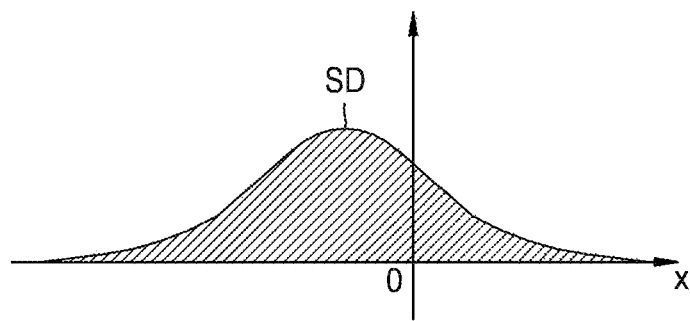
FIGS. 6A-6C illustrate an example of operation S620 of FIG. 5, according to an exemplary embodiment.
Figure 6B:
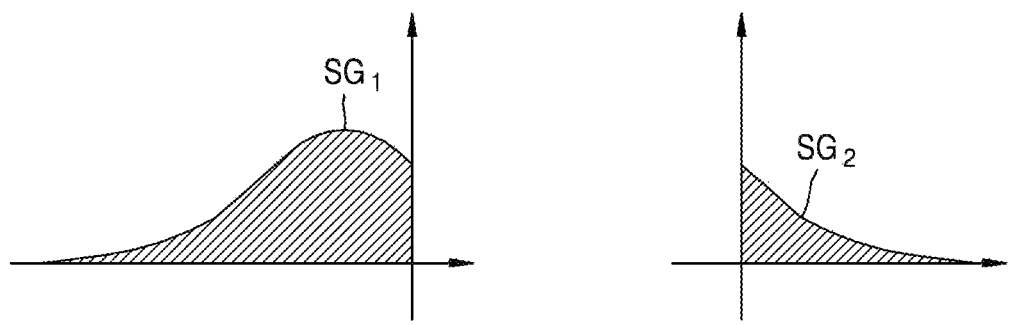
Figure 6C:
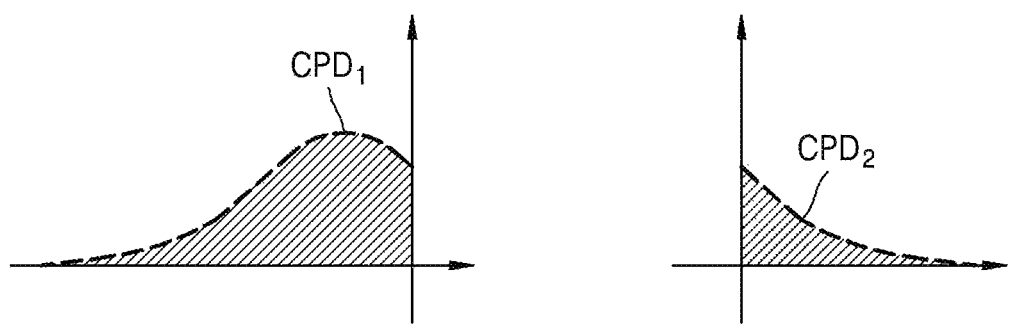

FIGS. 6A-6C illustrate an example of operation S620 of FIG. 5, according to an exemplary embodiment. As described above with reference to FIG. 5, in operation S620, a sample distribution may be split into at least two sample groups. In detail, FIGS. 6A-6C illustrate an example of an operation of splitting a sample distribution SD into two sample groups $SG_1$ and $SG_2$.

Referring to FIG. 6A, the sample distribution SD may be provided from an ANN to which quantized parameters have been applied. Referring to FIG. 6B, the sample distribution SD may be split into the two sample groups $SG_1$ and $SG_2$, based on zero. According to one or more exemplary embodiments, the sample distribution SD may be split into a first sample group $SG_1$ including negative samples and zero and a second sample group $SG_2$ including positive samples. According to one or more exemplary embodiments, the sample distribution SD may be split into a first sample group $SG_1$ including negative samples and a second sample group $SG_2$ including zero and positive samples. According to one or more exemplary embodiments, the sample distribution SD may be split into a first sample group $SG_1$ including negative samples and a second sample group $SG_2$ including positive samples, and zero may be excluded. Referring to FIG. 6C, the first sample group $SG_1$ and the second sample group $SG_2$ may be independently approximated to a first CPD $CPD_1$ and a second CPD $CPD_2$, respectively. According to one or more exemplary embodiments, each of the first sample group $SG_1$ and the second sample group $SG_2$ may be approximated to a generalized gamma distribution, and parameters of the first CPD $CPD_1$ and the second CPD $CPD_2$ may be estimated using [Equation 3] and [Equation 4].

Figure 7:
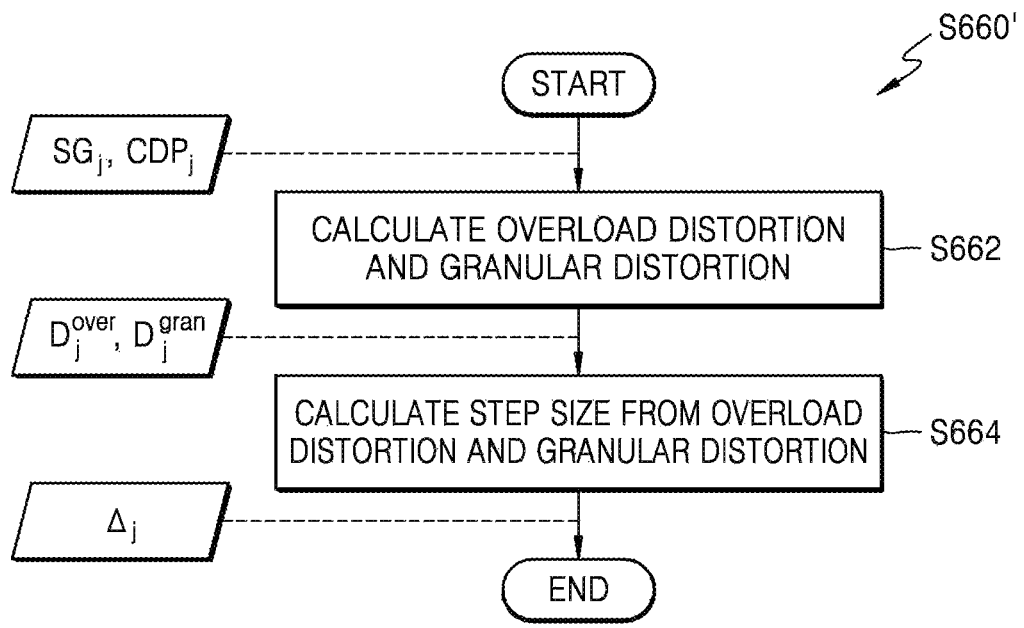
FIG. 7 is a flowchart of an example of operation S660 of FIG. 5, according to an exemplary embodiment.

FIG. 7 is a flowchart of an example of operation S660 of FIG. 5, according to an exemplary embodiment. As described above with reference to FIG. 5, in operation S660' of FIG. 7, step sizes corresponding to the sample distributions may be calculated. In detail, FIG. 7 illustrates an example of calculating a step size, based on a single sample group $SG_j$ and a CPD $CPD_j$ to which the sample group $SG_j$ has been approximated. As shown in FIG. 7, operation S660' may include operation S662 and operation S664.

In operation S662, an overload distortion and a granular distortion may be calculated. The overload distortion may represent an error caused by an input that deviates from a restricted region, when the input is quantized in the restricted region. Spacing between quantization results within the restricted region of the input may be referred to as granularity, and the granular distortion may represent an error caused by this spacing. According to one or more exemplary embodiments, when a (−L, L) section is uniformly quantized, a quantization level $S_i$ may be represented as in [Equation 5].

$$S_i = \left( y_i - \frac{\Delta}{2}, y_i + \frac{\Delta}{2} \right), 1 \leq i \leq N \quad \text{[Equation 5]}$$

Accordingly, an overload distortion may be defined as $D_N^{over}(L)$ may be defined as in [Equation 6].

$$D_N^{over}(L) = \int_L^{\infty} (x - y_N)^2 p(x) dx, \; y_i = -L + (i - \frac{1}{2})\Delta \quad \text{[Equation 6]}$$

A granular distortion $D_N^{gran}(L)$ may be defined as in [Equation 7].

$$D_N^{gran}(L) = \sum_{i=1}^{N} \int_{S_i} (x - y_i)^2 p(x) dx, \quad \text{[Equation 7]}$$

$$y_i = -L + \left( i - \frac{1}{2} \right)\Delta$$

Accordingly, the overload distortion $D_j^{over}$ and the granular distortion $D_j^{gran}$ corresponding to the sample group $SG_j$ and the CPD $CPD_j$ may be calculated.

In operation S664, a step size may be calculated from the overload distortion and the granular distortion. For example, as shown in [Equation 8], an overall distortion $D_j$ may be calculated from the overload distortion $D_j^{over}$ and the granular distortion $D_j^{gran}$.

$$D_j = D_j^{over} + D_j^{gran} \quad \text{[Equation 8]}$$

According to one or more exemplary embodiments, when the overload distortion $D_N^{over}(L)$ and the granular distortion $D_N^{gran}(L)$ are calculated using [Equation 6] and [Equation 7], a step size $\Delta_N$ that minimizes the overall distortion $D_j$, which is a sum of the overload distortion $D_N^{over}(L)$ and the granular distortion $D_N^{gran}(L)$, may be calculated. For example, the step size $\Delta_N$ that minimizes the overall distortion $D_j$ may be calculated using [Equation 9] when the CPD $CPD_j$ is a generalized gamma distribution.

$$\Delta_N = 2L_N/N, \text{ where} \quad \text{[Equation 9]}$$

$$L_N = \left[ \frac{2\ln N}{\lambda} - \left(2 - \frac{1+\beta}{\alpha}\right)\frac{\ln \ln N}{\lambda} - \frac{1}{\lambda}\ln\left(\frac{2^{1-(1+\beta)/\alpha}\alpha^2 \lambda^{(1+\beta)/\alpha}}{3\mu}\right) + \epsilon_N \right]^{1/\alpha}$$

$$\epsilon_N \equiv \frac{1}{\lambda}\ln\left[\frac{\left(1 + \frac{2\alpha \ln N}{N}\right)\left(1 + \frac{3 - 3\alpha + 2\beta}{2\alpha \ln N}\right)}{1 + \frac{1}{2\ln N}\left(\frac{\left(2 - \frac{1+\beta}{\alpha}\right)\ln \ln N + }{\ln\left(\frac{2^{1-(1+\beta)/\alpha}\alpha^2 \lambda^{(1+\beta)/\alpha}}{3\mu}\right)}\right)^{2-(1+\beta)/\alpha}}\right]$$

As such, the step size $\Delta_N$ that minimizes the overall distortion $D_j$ may be derived based on a closed form. Unlike the above-description, according to one or more exemplary embodiments, when a closed form is not induced from a CPD in order to calculate a step size, a numerical analysis may be used.

As described above, the step size $\Delta_j$ corresponding to the sample group $SG_j$ may be calculated in operation S660'. As a result, at least two step sizes respectively corresponding to at least two sample groups may be calculated. For example, when the sample distribution SD is split into the first sample group $SG_1$ and the second sample group $SG_2$ as described above with reference to FIGS. 6A-6C, the first step size $\Delta_1$ and the second step size $\Delta_2$ respectively corresponding to the first sample group $SG_1$ and the second sample group $SG_2$ may be calculated. FIGS. 8, 9, 10A, and 10B, illustrating examples of operation S680 of FIG. 5, performed after operation S660 of FIG. 5, will now be described supposing that the sample distribution SD is split into the first sample group $SG_1$ and the second sample group $SG_2$ and the first step size $\Delta_1$ and the second step size $\Delta_2$ are calculated. However, it is understood that one or more other exemplary embodiments are not limited thereto.

Figure 8:
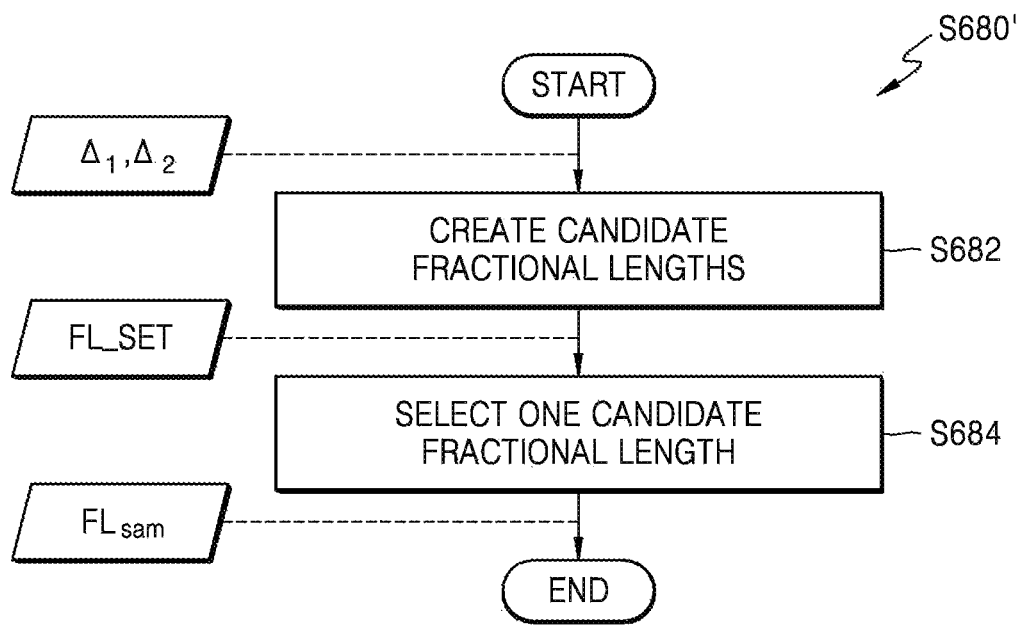
FIG. 8 is a flowchart of an example of operation S680 of FIG. 3, according to an exemplary embodiment.

FIG. 8 is a flowchart of an example of operation S680 of FIG. 3, according to an exemplary embodiment. As described above with reference to FIG. 5, in operation S680' of FIG. 8, the fractional length $FL_{sam}$ for a sample distribution may be selected. As shown in FIG. 8, operation S680' may include operation S682 and operation S684.

In operation S682, candidate fractional lengths may be generated. For example, a range of candidate fractional lengths may be determined (e.g., obtained) from the first step size $\Delta_1$ and the second step size $\Delta_2$, and fractional lengths included in the range may be provided as the candidate fractional lengths. Accordingly, a candidate fractional length set FL_SET including at least one candidate fractional length may be generated. An example of operation S682 will be described below with reference to FIG. 9.

In operation S684, one candidate fractional length may be selected (e.g., obtained or determined). For example, a candidate fractional length that provides a smallest quantization error may be selected from the candidate fractional length set FL_SET, and accordingly, the fractional length $FL_{sam}$ for the sample distribution may be finally derived. According to one or more exemplary embodiments, the candidate fractional length may be selected using various methods, and some examples of operation S684 will be described below with reference to FIGS. 10A and 10B.

Figure 9:
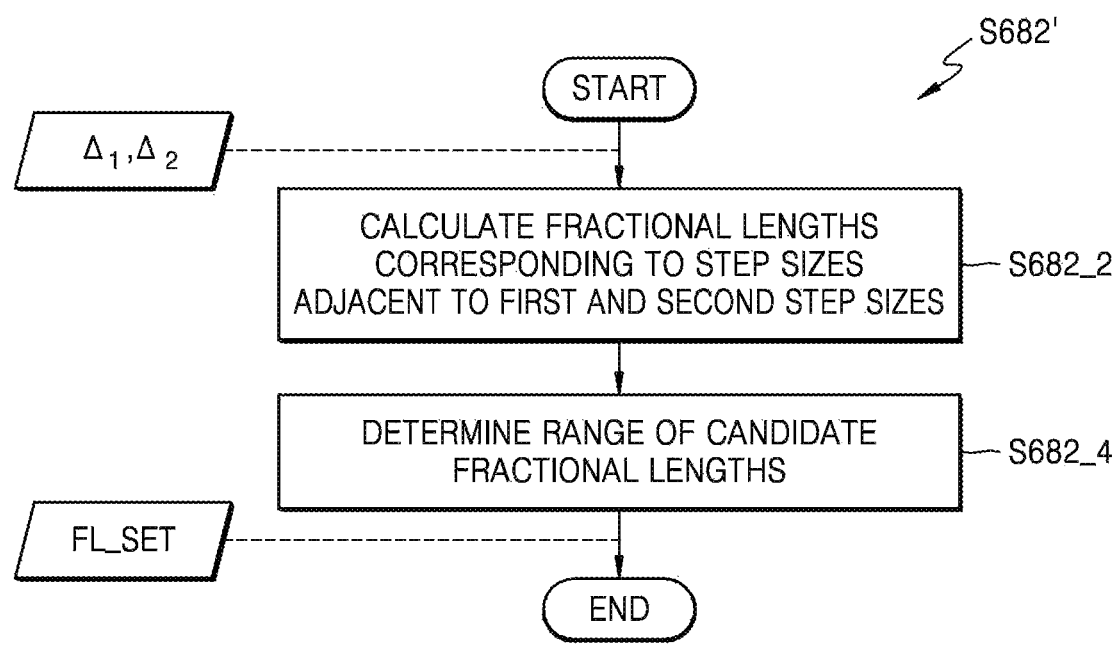
FIG. 9 is a flowchart of an example of operation S682 of FIG. 8, according to an exemplary embodiment.

FIG. 9 is a flowchart of an example of operation S682 of FIG. 8, according to an exemplary embodiment. As described above with reference to FIG. 8, in operation S682' of FIG. 9, candidate fractional lengths may be generated. As shown in FIG. 9, operation S682' may include operation S682_2 and operation S682_4.

In operation S682_2, a range of the candidate fractional lengths may be determined. According to one or more exemplary embodiments, the fractional lengths of step sizes adjacent to the first and second step sizes $\Delta_1$ and $\Delta_2$ may be calculated. For example, as in [Equation 10], 4 fractional lengths corresponding to the step sizes adjacent to the first step size $\Delta_1$ and the second step size $\Delta_2$ may be calculated.

$$FL_{1,\,ceil} = -\text{ceil}(\log_2 \Delta_1)$$

$$FL_{1,\,floor} = -\text{floor}(\log_2 \Delta_1)$$

$$FL_{2,\,ceil} = -\text{ceil}(\log_2 \Delta_2)$$

$$FL_{2,\,floor} = -\text{floor}(\log_2 \Delta_2) \quad \text{[Equation 10]}$$

In [Equation 10], "ceil( )" may be a ceiling function, and "floor( )" may be a floor function. Next, the range of the candidate fractional lengths may be determined based on a maximum fractional length and a minimum fractional length from among the calculated fractional lengths. For example, the candidate fractional length set FL_SET may be defined as in [Equation 11].

$$FL\_SET = \left\{ x \,\middle|\, \begin{array}{l} \min\left(\begin{array}{l}FL_{1,\text{ceil}}, FL_{1,\text{floor}}, \\ FL_{2,\text{ceil}}, FL_{2,\text{floor}}\end{array}\right) - M_{margin} \leq x \leq \\ \max\left(\begin{array}{l}FL_{1,\text{ceil}}, FL_{1,\text{floor}}, \\ FL_{2,\text{ceil}}, FL_{2,\text{floor}}\end{array}\right) + N_{margin} \end{array} \right\} \quad \text{[Equation 11]}$$

In [Equation 11], a first margin $M_{margin}$ and a second margin $N_{margin}$ may be used to correct an error that may be generated due to a difference between an input sample distribution and a sample distribution to which the input sample distribution has been approximated (i.e., a CPD). As in [Equation 11], a lower limit of the candidate fractional lengths may be determined as a value obtained by subtracting the first margin $M_{margin}$ from a minimum value of the parameters of [Equation 10], and an upper limit of the candidate fractional lengths may be determined as a value obtained by adding the second margin $N_{margin}$ from a maximum value of the parameters of [Equation 10]. According to one or more exemplary embodiments, the first margin $M_{margin}$ and the second margin $N_{margin}$ may be set to be maximum values within a limit allowed by calculation complexity or a performing ability (or computing resources) of the quantization system 100 of FIG. 1, and accordingly, the range of the candidate fractional lengths may be expanded.

Figure 10A:
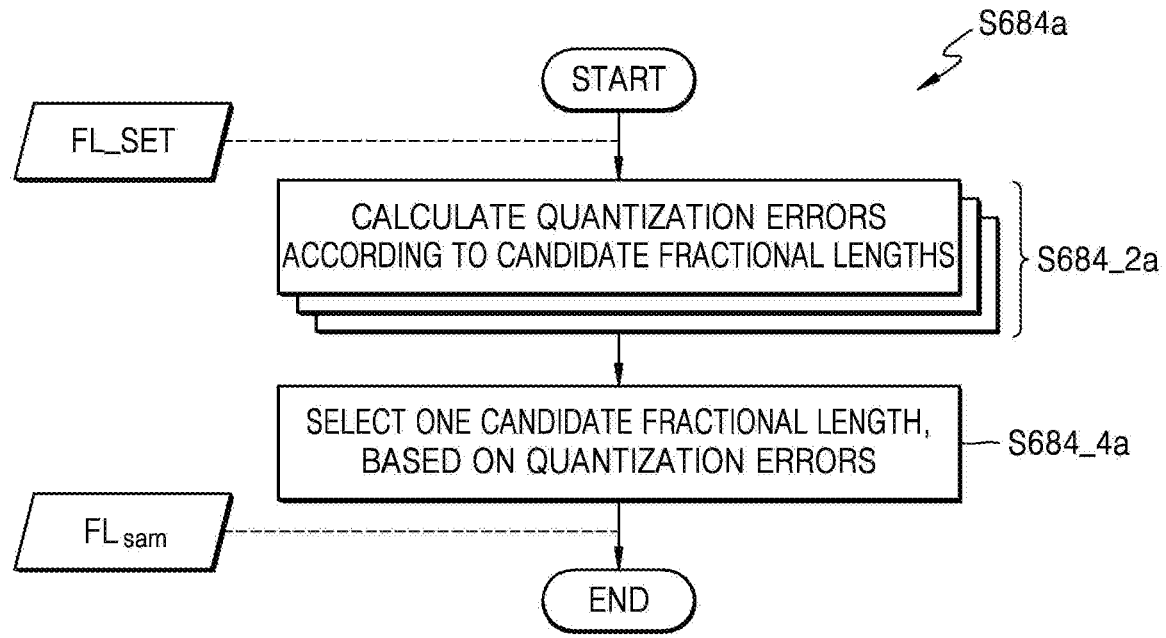
FIGS. 10A and 10B are flowcharts of examples of operation S684 of FIG. 8, according to one or more exemplary embodiments.
Figure 10B:
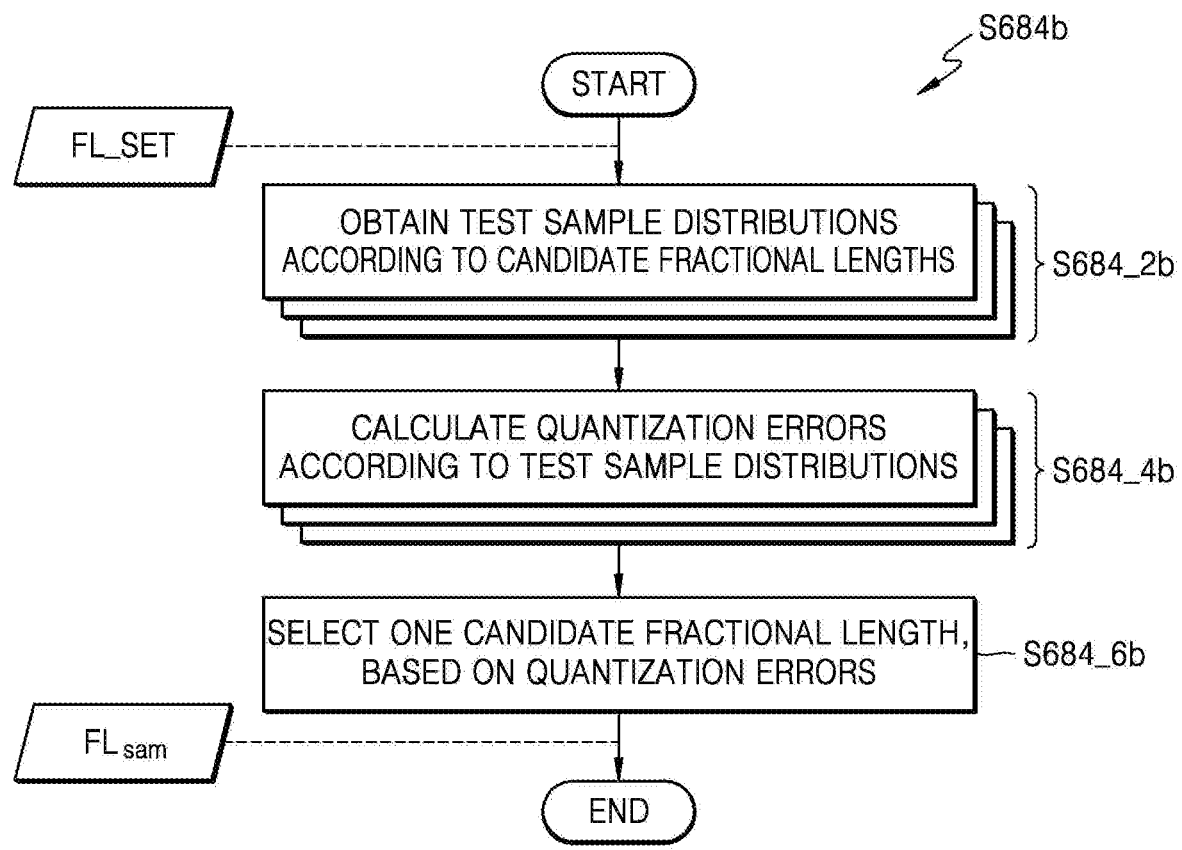

FIGS. 10A and 10B are flowcharts of examples of operation S684 of FIG. 8, according to one or more exemplary embodiments. In detail, FIG. 10A illustrates an example according to a closed form, and FIG. 10B illustrates an example according to a sample-based method. As described above with reference to FIG. 8, in operations S684a and S684b of FIGS. 10A and 10B, one candidate fractional length may be selected. Overlapping descriptions between FIGS. 10A and 10B will now be omitted.

Referring to FIG. 10A, operation S684a may include operation S684_2a and operation S684_4a. In operation S684_2a, quantization errors according to candidate fractional lengths may be calculated. The quantization errors may be calculated using various methods, such as an MSE and an SQNR. A quantization error corresponding to one candidate fractional length FL from the candidate fractional length set FL_SET derived by a generalized gamma distribution as in, for example, [Equation 3] and [Equation 4] may be calculated using [Equation 12].

$$\hat{D}_O(FL) = \qquad \text{[Equation 12]}$$
$$\rho \hat{D}_N(FL, \alpha_1, \beta_1, \lambda_1, \mu_1) + (1-\rho)\hat{D}_N(FL, \alpha_2, \beta_2, \lambda_2, \mu_2)$$
$$\hat{D}_N(\hat{L}_N, \alpha, \beta, \lambda, \mu) = \frac{1}{12}\left(\frac{2\hat{L}_N}{N}\right)^2 + \frac{4\mu}{(\alpha\lambda)^3}\frac{e^{-\lambda L_N^\alpha}}{L_N^{3\alpha-\beta-3}},$$
$$FL \in FL\_SET$$

In [Equation 12], $\rho$ indicates a value that determines weights of the first sample group $SG_1$ and the second sample group $SG_2$, and may be defined as in, for example, [Equation 13].

$$\rho = \frac{\#\ of\ \textit{netative}\ samples}{\#\ of\ total\ samples} \qquad \text{[Equation 13]}$$

Accordingly, quantization errors corresponding to the candidate fractional lengths included in the candidate fractional length set FL_SET may be calculated.

In operation S684_4a, one candidate fractional length may be selected based on the quantization errors. For example, based on the quantization errors calculated as in [Equation 12], a candidate fractional length that provides a smallest quantization error may be selected as the fractional length $FL_{sam}$ for the sample distribution. In other words, as in [Equation 14], the fractional length $FL_{sam}$ for the sample distribution may be selected.

$$FL_{sam} = \underset{FL \in FL\_SET}{\mathrm{argmin}}\ \hat{D}_O(FL) \qquad \text{[Equation 14]}$$

Referring to FIG. 10B, operation S684b may include operations S684_2b, S684_4b, and S684_6b. In operation S684_2b, test sample distributions according to candidate fractional lengths may be obtained. For example, the sample quantizer 160 of FIG. 1 may provide the candidate fractional lengths included in the candidate fractional length set FL_SET to the neural network system 200 of FIG. 1 via the neural network interface 120, and the neural network system 200 may generate sample distributions, namely, test sample distributions, by driving ANNs to which the candidate fractional lengths have been respectively applied. Accordingly, the sample quantizer 160 may receive test sample distributions $SD_{test1}$, $SD_{test2}$, . . . from the neural network system 200 via the neural network interface 120.

In operation S684_4b, quantization errors according to the test sample distributions may be calculated. The quantization errors may be calculated from the test sample distributions and the sample distributions by using various methods, for example, an MSE and an SQNR. Accordingly, quantization errors corresponding to the candidate fractional lengths included in the candidate fractional length set FL_SET may be generated.

In operation S684_6b, one candidate fractional length may be selected based on the quantization errors. For example, in operation S684_6b, a candidate fractional length that provides a smallest quantization error may be selected as the fractional length $FL_{sam}$ for the sample distribution.

Figure 11:
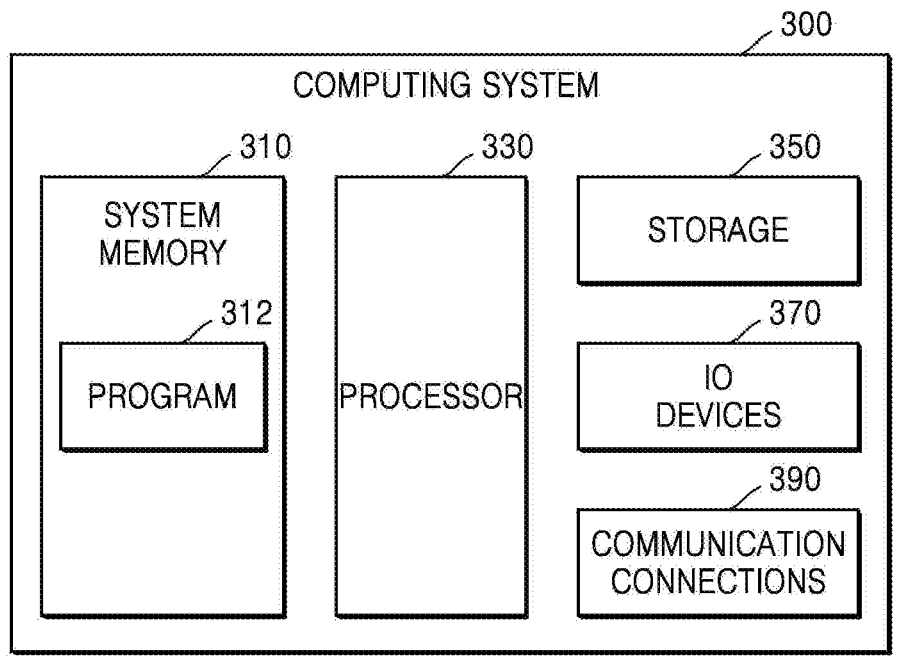
FIG. 11 is a block diagram of a computing system according to an exemplary embodiment.

FIG. 11 is a block diagram of a computing system 300 according to an exemplary embodiment. According to one or more exemplary embodiments, the quantization system 100 of FIG. 1 may be implemented using the computing system 300 of FIG. 11. Referring to FIG. 11, the computing system 300 may include a system memory 310, a processor 330, a storage 350, input/output (I/O) devices 370, and communication connections 390. The components of the computing system 300 may be interconnected, e.g., via a bus.

The system memory 310 may include a program 312. The program 312 may allow the processor 330 to quantize an ANN according to one or more exemplary embodiments. For example, the program 312 may include a plurality of instructions executable by the processor 330, and an ANN may be quantized as the plurality of instructions of the program 312 are executed by the processor 330. Non-limiting examples of the system memory 310 may include a volatile memory, such as Static Random Access Memory (SRAM) and Dynamic Random Access Memory (DRAM), and a non-volatile memory, such as a flash memory.

The processor 330 may include at least one core capable of executing any instruction set (e.g., Intel Architecture-32 (IA-32), 64-bit extension IA-32, x86-64, PowerPC, Sparc, MIPS, ARM, and IA-64). The processor 330 may execute instructions stored in the system memory 310 and may quantize an ANN by executing the program 312.

The storage 350 may not lose stored data even if power supplied to the computing system 300 is cut off. For example, the storage 350 may be a non-volatile memory, such as electrically erasable programmable read-only memory (EEPROM), a flash memory, phase change random access memory (PRAM), resistance random access memory (RRAM), nano-floating gate memory (NFGM), polymer random access memory (PoRAM), magnetic random access memory (MRAM), ferroelectric random access memory (FRAM), or a storage medium, such as a magnetic tape, an optical disk, or a magnetic disk. According to one or more exemplary embodiments, the storage 350 may be detachably attached to the computing system 300.

According to one or more exemplary embodiments, the storage 350 may store a program 312 for quantization of an ANN according to an exemplary embodiment, and the program 312 or at least a portion thereof from the storage 350 may be loaded into the system memory 310 before the program 312 is executed by the processor 330. According to one or more exemplary embodiments, the storage 350 may store a file written in a programming language, and a program 312 generated by a compiler or the like or at least a portion of the program 312 from the file may be loaded into the system memory 310.

According to one or more exemplary embodiments, the storage 350 may store data that is to be processed by the processor 330, and/or data processed by the processor 330. For example, the storage 350 may store the parameters and the sample distributions of FIG. 2, may store the quantized parameters and the quantized sample distributions, and may store data generated during quantization of a parameter or sample distribution, for example, a step size and a fractional length.

The I/O devices 370 may include an input device, such as a keyboard or a pointing device, and an output device, such as a printer or a display. For example, a user may trigger the execution of the program 312 by the processor 330 via the I/O devices 370, may input a parameter and a sample distribution, and may check a quantized parameter, a quantized sample distribution, and/or an error message.

The communications connections 390 may provide access to a network outside the computing system 300. For example, the network may include multiple computing systems and communication links, and the communication links may include wired links, optical links, wireless links, or any other type of links.

Figure 12:
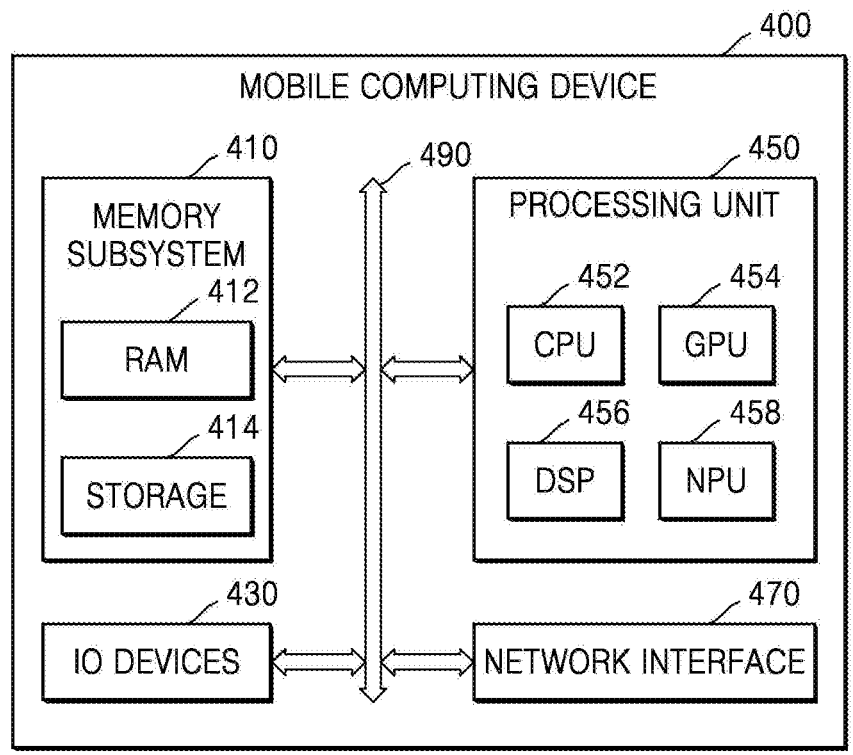
FIG. 12 is a block diagram of a mobile computing device according to an exemplary embodiment.

FIG. 12 is a block diagram of a mobile computing device 400 according to an exemplary embodiment of the inventive concept. According to one or more exemplary embodiments, a fixed-point neural network quantized according to an exemplary embodiment may be implemented in the mobile computing device 400. As a non-limiting example, the mobile computing device 400 may be any of mobile electronic devices, such as a mobile phone, a tablet PC, a wearable device, and an object Internet device, which are powered by a battery, an external power supply, or via self power generation.

Referring to FIG. 12, the mobile computing device 400 may include a memory subsystem 410, I/O devices 430, a processing unit 450, and a network interface 470. The memory subsystem 410, the I/O devices 430, the processing unit 450, and the network interface 470 may communicate with each other via a bus 490. According to one or more exemplary embodiments, at least two of the memory subsystem 410, the I/O devices 430, the processing unit 450, and the network interface 470 may be included in one package as a System-on-Chip (SoC).

The memory subsystem 410 may include RAM 412 and a storage 414. The RAM 412 and/or the storage 414 may store instructions that are executed by the processing unit 450, and data that are processed by the processing unit 450. For example, the RAM 412 and/or the storage 414 may store variables such as signals, weights, biases, and thresholds of an ANN and may also store parameters of an artificial neuron (or computational node) of an ANN. According to one or more exemplary embodiments, the storage 414 may include a non-volatile memory.

The processing unit 450 may include at least one of a central processing unit (CPU) 452, a graphics processing unit (GPU) 454, a digital signal processor (DSP) 456, and a neural processing unit (NPU) 458. For example, according to one or more exemplary embodiments, the processing unit 450 may include one or only some of the CPU 452, the GPU 454, the DSP 456, and the NPU 458.

The CPU 452 may control the overall operation of the mobile computing device 400. For example, the CPU 452 may directly perform a specific task in response to an external input received through the I/O devices 430, or may direct other components of the processing unit 450 to perform a task. The GPU 454 may generate data for an image output through a display included in the I/O devices 430 and may encode data received from a camera included in the I/O devices 430. The DSP 456 may generate useful data by processing a digital signal, e.g., a digital signal provided from the network interface 470.

The NPU 458, which is dedicated hardware for an ANN, may include a plurality of computational nodes corresponding to at least some artificial neurons that constitute the ANN, and at least some of the plurality of computational nodes may process a signal in parallel. An ANN quantized according to an exemplary embodiment, for example, a DNN, has low computational complexity as well as high accuracy, and thus may be easily implemented in the mobile computing device 400 of FIG. 12, may have a fast processing speed, and may also be implemented by, for example, a simple and small-scale NPU 458.

The I/O devices 430 may include input devices, such as a touch input device, a sound input device, and a camera, and output devices, such as a display and a sound output device. For example, when a user's voice is input through the sound input device, the voice may be recognized by a DNN implemented in the mobile computing device 400, and a corresponding operation may be triggered. In addition, when an image is input through the camera, an object in the image may be recognized by the DNN implemented in the mobile computing device 400, and an output such as virtual reality may be provided to a user. The network interface 470 may provide access to a mobile communication network, such as Long Term Evolution (LTE) or 5G, to the mobile computing device 400 and may provide access to a local network such as Wi-Fi.

One or more exemplary embodiments have been particularly shown and described above with reference to the drawings. The terminology used herein is for the purpose of describing exemplary embodiments only and is not intended to be limiting of the inventive concept. Therefore, it will be understood by those skilled in the art that various changes in form and details may be made therein without departing from the spirit and scope of the inventive concept as defined by the appended claims.

What is claimed is:

1. An artificial neural network (ANN) quantization method for generating an output ANN by quantizing an input ANN, the ANN quantization method comprising:
   obtaining second parameters by quantizing first parameters of the input ANN;
   obtaining a sample distribution from an intermediate ANN in which the obtained second parameters have been applied to the input ANN, wherein the obtained sample distribution includes outputs of one layer in the intermediate ANN;
   obtaining a fractional length for the obtained sample distribution by quantizing the obtained sample distribution,
   wherein the obtaining the fractional length for the obtained sample distribution comprises:
      splitting the outputs of the one layer in the obtained sample distribution into a plurality of sample groups;
      obtaining a plurality of step sizes, wherein each step size has a one-to-one correspondence with a different sample group among the plurality of sample groups;
      obtaining candidate fractional lengths, based on the obtained plurality of step sizes, wherein a first step size corresponds to a first fractional length and a second step size corresponds to a second fractional length that is different from the first fractional length; and selecting, as the fractional length, one from among the obtained candidate fractional lengths, wherein each of the plurality of step sizes is obtained based on a corresponding sample group and a continuous probability distribution (CPD) approximated from the corresponding sample group.

2. The ANN quantization method of claim 1, wherein the obtaining the second parameters comprises:

obtaining quantized parameters by quantizing the first parameters according to a given fractional length, and calculating quantization errors between the first parameters and the obtained quantized parameters;

calculating an evaluation value of the given fractional length, based on the calculated quantization errors; and obtaining a final fractional length for the second parameters, based on a plurality of evaluation values corresponding to a plurality of fractional lengths.

3. The ANN quantization method of claim 2, wherein:

the calculating the evaluation value comprises calculating, as the evaluation value, a sum of squares of the calculated quantization errors; and the obtaining the final fractional length comprises determining, as the final fractional length, a fractional length corresponding to a minimum evaluation value from among the plurality of evaluation values.

4. The ANN quantization method of claim 1, wherein:

the input ANN comprises layers and channels, each having at least one parameter; and the first parameters comprise one or more parameters from among the at least one parameter of each of the layers and the channels.

5. The ANN quantization method of claim 4, wherein the first parameters comprise at least one of weights, biases, and thresholds.

6. The ANN quantization method of claim 1, wherein the splitting the obtained sample distribution into the plurality of sample groups comprises splitting the obtained sample distribution into a first sample group including negative samples and zero and a second sample group including positive samples.

7. The ANN quantization method of claim 1, wherein:

the splitting of the obtained sample distribution into the plurality of sample groups comprises splitting the obtained sample distribution into a first sample group and a second sample group; and the first sample group includes negative samples, and the second sample group includes zero and positive samples.

8. The ANN quantization method of claim 1, wherein:

the splitting the obtained sample distribution into the plurality of sample groups comprises splitting the obtained sample distribution into a first sample group and a second sample group; and the first sample group includes negative samples, and the second sample group includes positive samples.

9. The ANN quantization method of claim 1, wherein the approximating the plurality of sample groups comprises approximating each of the plurality of sample groups to a generalized gamma distribution, a Gaussian distribution, or a Laplacian distribution.

10. The ANN quantization method of claim 1, wherein the obtaining the plurality of step sizes comprises:

obtaining an overload distortion and a granular distortion according to a step size for each CPD; and obtaining each of the plurality of step sizes, based on the obtained overload distortion and the obtained granular distortion.

11. The ANN quantization method of claim 1, wherein the obtaining the candidate fractional lengths comprises:

obtaining fractional lengths corresponding to step sizes adjacent to the obtained plurality of step sizes; and determining a range of fractional lengths, based on the obtained fractional lengths.

12. The ANN quantization method of claim 11, wherein:

the determining the range of the fractional lengths comprises:

determining, as a lower limit of the range, a value obtained by subtracting a first margin from a minimum fractional length among the obtained fractional lengths, and determining, as an upper limit of the range, a value obtained by adding a second margin from a maximum fractional length among the obtained fractional lengths; and the first margin and the second margin are determined based on a performing ability of the ANN quantization method.

13. The ANN quantization method of claim 11, wherein the selecting the one from among the obtained candidate fractional lengths comprises:

calculating errors corresponding to the obtained candidate fractional lengths, based on the obtained candidate fractional lengths and a plurality of CPDs; and selecting the one candidate fractional length, based on the calculated errors.

14. The ANN quantization method of claim 11, wherein the selecting the one from among the obtained candidate fractional lengths comprises:

obtaining test sample distributions from test ANNs respectively depending on the obtained candidate fractional lengths;

calculating errors corresponding to the obtained test sample distributions, based on the obtained test sample distributions and a plurality of CPDs; and selecting the one candidate fractional length, based on the calculated errors.

15. The ANN quantization method of claim 1, further comprising obtaining a fixed-point ANN as the output ANN, based on the obtained second parameters and the obtained fractional length.

16. An apparatus for generating an output artificial neural network (ANN) by quantizing an input ANN, the apparatus comprising:

a memory storing computer-executable instructions; and at least one processor configured to execute the stored computer-executable instructions to:

obtain second parameters by quantizing first parameters of the input ANN;

obtain a sample distribution from an intermediate ANN in which the obtained second parameters have been applied to the input ANN, wherein the obtained sample distribution includes outputs of one layer in the intermediate ANN;

obtain a fractional length for the obtained sample distribution by:

splitting the outputs of the one layer in the obtained sample distribution into a plurality of sample groups;

obtaining a plurality of step sizes, wherein each step size has a one-to-one correspondence with a different sample group among the plurality of sample groups;

obtaining candidate fractional lengths, based on the obtained plurality of step sizes, wherein a first step size corresponds to a first fractional length and a second step size corresponds to a second fractional length that is different from the first fractional length; and selecting, as the fractional length, one from among the obtained candidate fractional lengths, wherein each of the plurality of step sizes is obtained based on a corresponding sample group and a continuous probability distribution (CPD) approximated from the corresponding sample group.

17. The apparatus of claim 16, wherein the at least one processor is further configured to execute the instructions to:

provide at least one candidate fractional length for the obtained sample distribution, received from a sample quantizer, to a test ANN, and to obtain a test sample distribution from the test ANN; and determine one from among the at least one candidate fractional length as the fractional length for the obtained sample distribution, based on the obtained test sample distribution.

18. A method of quantizing a floating-point neural network, the method comprising:

obtaining quantized parameters by quantizing parameters in a same category in the floating-point neural network;

obtaining a sample distribution from a semifixed-point artificial neural network (ANN) in which the obtained quantized parameters have been applied to the floating-point neural network, wherein the obtained sample distribution includes outputs of one layer in the semifixed-point ANN;

obtaining a fractional length for the obtained sample distribution, wherein the obtaining the fractional length for the obtained sample distribution comprises:

splitting the outputs of the one layer in the obtained sample distribution into a plurality of sample groups;

obtaining a plurality of step sizes, wherein each step size has a one-to-one correspondence with a different sample group among the plurality of sample groups;

obtaining candidate fractional lengths, based on the obtained plurality of step sizes, wherein a first step size corresponds to a first fractional length and a second step size corresponds to a second fractional length that is different from the first fractional length; and selecting, as the fractional length, one from among the obtained candidate fractional lengths, wherein each of the plurality of step sizes is obtained based on a corresponding sample group and a continuous probability distribution (CPD) approximated from the corresponding sample group.

* * * * *